Aug. 10, 1937.　　　　H. D. GEYER　　　　2,089,471

HYDRAULIC BRAKE

Filed Jan. 2, 1936

Inventor
Harvey D. Geyer
By Blackmore, Spencer & Flint
Attorneys

Patented Aug. 10, 1937

2,089,471

UNITED STATES PATENT OFFICE 2,089,471

HYDRAULIC BRAKE

Harvey D. Geyer, Dayton, Ohio, assignor to General Motors Corporation, Detroit, Mich., a corporation of Delaware Application January 2, 1936, Serial No. 57,106

5 Claims. (Cl. 60—54.6)

This invention relates to sealing means for a piston reciprocable in a cylinder. It has been designed more particularly as a seal for the piston of the wheel cylinder of a hydraulic brake system. It is, of course, useful in many other relations.

The invention may be described as an improvement for use in place of the flexible cup sealing means commonly used with a piston having a sliding fit in its cylinder and also as an improvement over other known forms of sealing means such as rubber cups peripherally secured to the cylinder and expansible axially by fluid pressure to move the piston engaged by the cup.

The object of the invention is to provide a seal between the cylinder and piston wherein leakage to or from the cylinder is prevented.

Another object is to provide such a seal wherein the piston movement may not damage the sealing means.

Another object is to provide a bond between the sealing means and the piston and cylinder which shall not fail during the life of the vehicle with which the device is used.

Other objects and advantages will be understood from the following description.

In the drawing accompanying the invention, Fig. 1 shows a vertical section through a brake drum having brake shoes therein with my novel shoe expanding means associated therewith.

Figure 1:
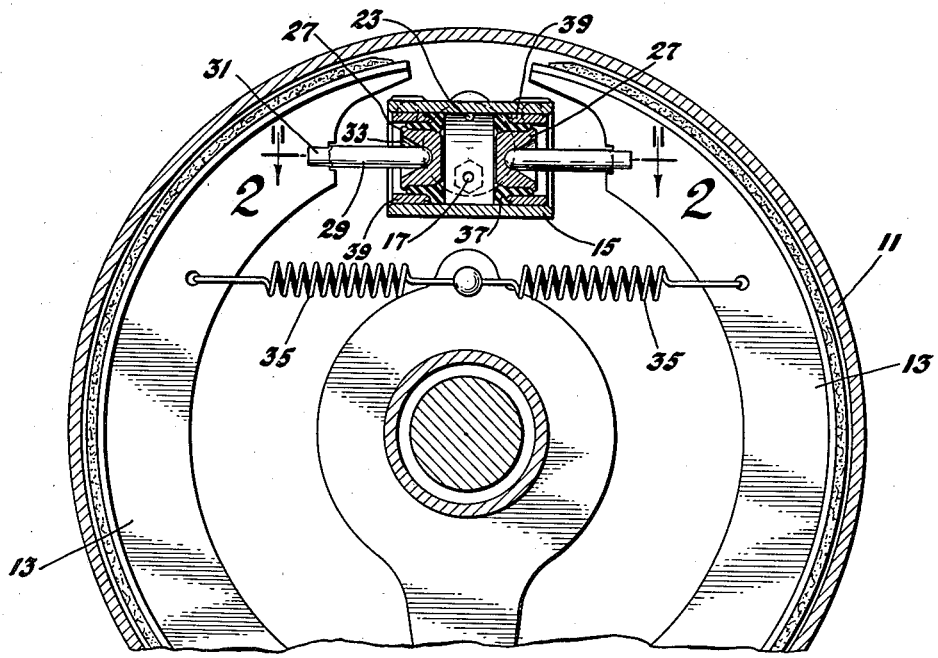

Referring to the drawing, numeral 11 is used to designate a wheel-carried drum adapted to be engaged by shoes 13, said shoes being anchored in any way preferred.

Between the adjacent ends of the shoes 13 is a wheel cylinder 15 secured in any convenient manner as by fastening means 14 to a fixed backing plate 16. A reciprocable piston to be more fully described is located in each end of cylinder 15. Between the pistons the cylinder wall has an aperture 17 adapted to receive a connection 19 at the end of a conduit 21 connecting with any preferred form of master cylinder. At 23 is a bleed opening closed by a plug 25, this provision being conventional and designed to permit the venting of trapped air.

The two pistons are marked 27. Their external diameter is appreciably less than the internal diameter of the cylinder. Between the pistons and the adjacent shoe ends are thrust pins 29. These pins may have bifurcated ends 31 to prevent rotation relative to the shoes and, at their opposite ends, are rounded to be received in similar shaped pockets 33 in the pistons. Releasing spring means are marked by numeral 35. There is shown no provision for adjustment of the distance between the pistons and the shoes to accommodate for lining wear. Any preferred adjustment may be used if desired.

The invention is concerned particularly with the sealing means between the piston and the cylinder, the idea being to provide such a seal as will effectively prevent the escape of the hydraulic fluid and also prevent the admission of air as sometimes occurs in the case of conventional sliding pistons. I prefer to use an annulus 37 of noncompressible flexible material such as rubber. This annulus is bonded to the external surface of the piston 27 and to the internal surface of a metallic ring 39, which latter is press-fitted into the cylinder 15. I make the bond by vulcanizing the rubber annulus to the piston and to the ring.

Figure 2:
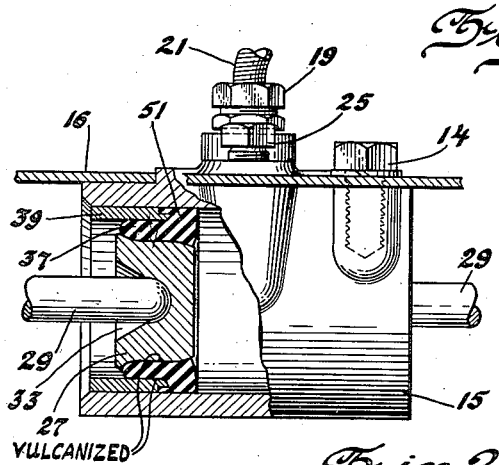
Fig. 2 is a top plan view, partly in transverse section, substantially on line 2—2 of Fig. 1.

Several types of bond are herein shown illustrating successive steps leading to that shown in Fig. 1 and Fig. 2 which I now believe to represent the best embodiment of my invention.

In my earliest steps leading up to the disclosure herein, I used a rubber ring corresponding in general to that marked 37 herein, which ring I vulcanized to a piston periphery and to the inner wall of a metallic ring resembling in a general way ring 39. I then subjected the piston to a coining step to expand it radially and reduce it axially. This had the effect of stretching the rubber circumferentially, compressing it radially, and effecting an elongation axially. In use, reciprocating movements of the piston produced a rolling action in the rubber annulus, the strained condition of the annulus serving of course to restore the parts to the initial position.

Figure 3:
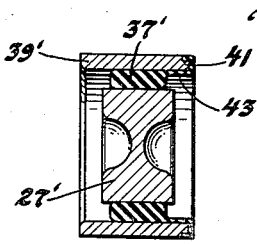

It was found advisable after testing these first vulcanized rubber cups to improve the bonded connections. The first step in the improvement is shown by Fig. 3. In this form the steel ring 39' is formed with a reduced diameter region 41 on its outer surface at one end. The rubber ring 37' is formed with an extension 43 fitting the inner surface of the end of the ring 39', and the extension 43 surrounds the end of the ring 39' and fills the space 41. This arrangement gives a greater area of contact and a better bond between the ring 39' and the rubber. Also, when the ring 39' is pressed into the cylinder, the rubber within the region 41 is held between the cylinder and ring, thus aiding in holding the rubber from separation from the ring and cylinder. This step in the development was found to improve very considerably the bond between the metallic ring and the rubber annulus.

Figure 4:
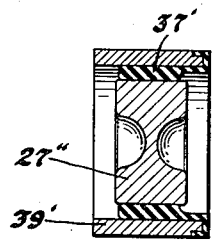
Figs. 3, 4 and 5 are three transverse sections of modified forms of sealing connections between the cylinder and the piston reciprocable therein.

To afford a better bond between the piston and the rubber ring, a larger diameter piston was used than in the form just described. The larger piston is shown by Fig. 4. It reduces the radial distance of the annular space between the piston 27" and the ring 39'. The rubber is then vulcanized to the two metal parts as before. When the piston is coined to expand it radially and reduce its axial length, the rubber is subjected to greater compression than with the smaller piston of Fig. 3 since the reduced volume of the annular space into which the rubber is expanded as compared with that of Fig. 3 is out of proportion to the reduction in volume of the rubber ring in the two cases prior to the coining of the piston. Also the circumferential grip of the rubber on the piston is increased owing to the use of the larger piston.

Figure 5:
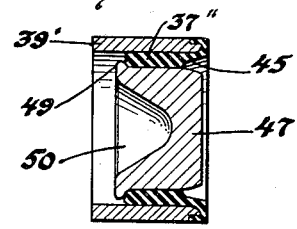

While these two steps improved the bond both with the piston and the metallic ring, a further improvement was made by adding somewhat to the mass of the rubber as at 45, see Fig. 5. In this form the inner end of the piston 47 is made flat, the peripheral wall formed as shown, and the other side has a wider and deeper flared opening 50 than in the earlier forms. This deeper opening has the effect of locating the point of engagement with the pin 29 deep down in the piston and preferably beyond its mid portion to the end of maintaining the axis of piston movement coincident with its normal axis of the piston when at rest. When this sort of piston is coined as before, there is formed a bead 49 as shown, which bead aids in holding in the rubber. The bead reduces the radial distance between the piston and the ring 39' whereby any tendency of the rubber to be squeezed through the annular space adjacent the bead is effectively resisted and the danger of damage to the rubber annulus or to its bond with the metal surfaces is avoided. This form showed considerable improvement. In life tests it was the rubber itself between the bonds which failed rather than the bonded region.

In the form shown in Fig. 1 and Fig. 2 substantially the same type of bonding is used. The mass of rubber is considerably increased not only by a greater radial thickness as at 51 but by reducing the axial length of the metallic ring 39 whereby the rubber extension of the metallic ring, so to speak, is of considerable length. This final form in which the invention is embodied is believed to be so free from weakness in the rubber itself and in the bond between the rubber and the metallic surfaces as to ensure freedom from leakage of the hydraulic medium or from the entrance of air to the hydraulic system that it may serve throughout the life of the vehicle on which it is used. The expedients frequently used with sliding pistons to prevent leakage need not be used and the danger of the metallic piston cutting the rubber as sometimes happens with cup shape seals is avoided. The device is comparatively inexpensive and is easily installed. It may be used with any brake shoe assembly and with any preferred form of master cylinder.

I claim:

1. A reciprocable member, a ring surrounding said member in spaced relation thereto, a rubber annulus located therebetween and bonded to both, said rubber annulus having a part integral therewith extending axially to and beyond the end of said spaced ring and bonded to both internal and external faces of said end.

2. The invention defined by claim 1, said rubber annulus also having a radial bead at the end thereof opposite said integral extension.

3. A cylinder, a ring press-fitted into said cylinder, a piston reciprocable in said cylinder, a rubber annulus between said piston and ring and bonded to both, said rubber annulus having a part integral therewith bonded to the end of said ring on both the external and internal faces thereof, whereby the outer part of said rubber annulus is held between the ring and cylinder.

4. A cylinder for hydraulic brakes, a ring press-fitted therein, a piston reciprocable in said cylinder and ring, a rubber annulus bonded to said piston and ring, said ring having an external recess at one end and said rubber annulus extending axially beyond the ring, filling said recess and bonded to the external wall of the ring within the recess.

5. A cylinder, a ring press-fitted therein, a piston reciprocable in said cylinder, a rubber annulus between said ring and annulus and bonded to both, said piston extending axially beyond one end of said ring and said rubber annulus filling the space between said piston extension and said cylinder.

HARVEY D. GEYER.